United States Patent [19]

Reuter

[11] Patent Number: 4,588,349

[45] Date of Patent: May 13, 1986

[54] ROBOTIC ORDER PICKING

[75] Inventor: Howard A. Reuter, Pasadena, Md.

[73] Assignee: The United States of America as represented by the Secretary of the Air Force, Washington, D.C.

[21] Appl. No.: 720,126

[22] Filed: Apr. 5, 1985

Related U.S. Application Data

[63] Continuation-in-part of Ser. No. 518,275, Jul. 28, 1983, abandoned.

[51] Int. Cl.⁴ ............................................. B65G 65/00
[52] U.S. Cl. ..................................... 414/786; 414/411; 414/420; 414/421; 901/6; 901/31
[58] Field of Search ............... 414/273, 280, 403, 404, 414/411, 756, 419–421, 680, 749, 729, 730, 735, 737, 222, 224, 744 A, 744 C; 198/339, 339.1, 346.1; 221/91; 206/329, 334, 485; 294/65.5; 901/6, 31

[56] References Cited

U.S. PATENT DOCUMENTS

| | | | |
|---|---|---|---|
| 3,826,383 | 7/1974 | Richter | 414/730 |
| 3,991,619 | 11/1976 | Appleford et al. | 198/339 X |
| 4,171,049 | 10/1979 | Nohara et al. | 206/334 X |
| 4,312,622 | 1/1982 | Favareto | 414/735 X |
| 4,455,117 | 6/1984 | Cartoceti | 414/421 X |

Primary Examiner—Joseph E. Valenza
Assistant Examiner—David A. Bucci
Attorney, Agent, or Firm—Donald J. Singer; Stanton E. Collier

[57] ABSTRACT

A method of filling a kit with required parts automatically. The parts are stored in an automatic storage and retrieval apparatus. The parts are held in a container stored in trays in the automatic storage and retrieval apparatus. On demand, a tray is placed at a transfer location whereat a robot arm removes the selected container, transports the selected container, opens the selected container over a kit box wherein the parts fall from the opened selected container, closes the selected container and returns it to the transfer location where the above apparatus replaces it in the storage area under another demand. The above continues until all parts are placed in the kit box.

1 Claim, 10 Drawing Figures

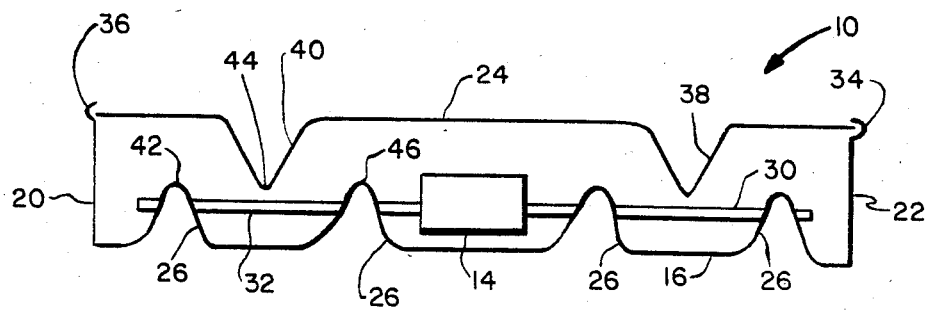
FIG. IA
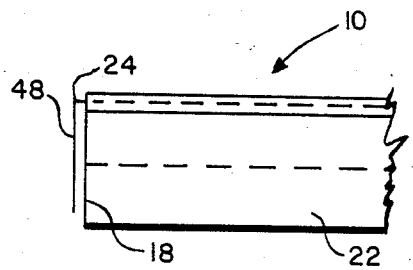
FIG. IB
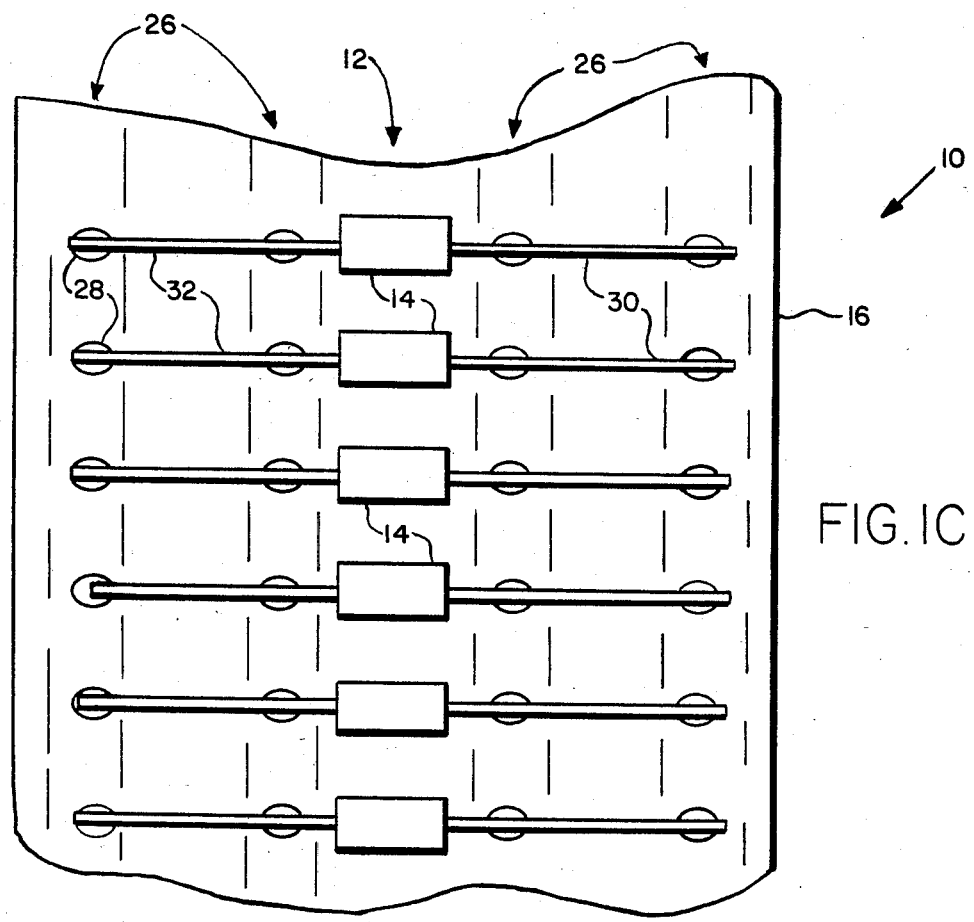
FIG. IC

ROBOTIC ORDER PICKING

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of patent application Ser. No. 518,275 filed July 28, 1983, now abandoned.

The present invention relates to a process for automatically filling an order for a kit, and, more particularly, relates to an automatic process of filling a kit with a selected number of components from stored closed containers.

In the past, kits of parts were assembled by persons selecting the desired parts from containers. Either the containers were carried to the person or the person walked to the containers.

The above process of filling kits is subject to error and is time consuming. The person must read the order for the kit which states the type of parts and the number of each type. The person must then select each type and number from a particular container and place them in a desired kit. Obviously, after a long time, the person becomes fatigued and this creates more chances for error.

The above drawbacks have motivated a search for a process to eliminate as much error as possible in the kitting process.

SUMMARY OF THE INVENTION

The present invention is directed toward providing a robotic order picking process in which these undesirable characteristics are minimized.

This process applies to parts that are small such as resistors, capacitors, diodes, transistors, etc. Each type of part is placed in a container in a serial manner, for example, so that when a lid of the container is partially opened, and the container inverted, the exposed parts will fall into a kit box. Each container has only parts of a particular type stored therein.

A plurality of containers being similarly shaped are stored in trays. The trays are stored in an automatic storage and retrieval apparatus. This apparatus has stored in a memory section the location of each type of part and number. When a particular part is required this apparatus will place the tray having the container with that part therein in a designated transfer location. Upon part removal, the tray will be returned to its storage location.

Once the tray is placed in the designated transfer location, a robot means will lift the selected container from the tray at the transfer location. The container will then be transported to a position over the kit box in an upside-down manner. The robot means by gripping means will then retract the lid on the container a predetermined distance which corresponds to a given number of exposed parts which will thus fall into the kit box. The robot means will close the lid and place the container back into the storage tray at the transfer location.

Based upon the parts required by the order, the above process will continue until each kit box has the desired parts therein. After the kit box is filled, the box is removed manually and another box placed upon a receiving location.

One object of the present invention is a robotic order picking process that is able to fill a kit box with small electronic component parts needed for assembling a printed circuit board, for example.

Another object of the present invention is a robotic order picking process that minimizes human intervention to fill a kit box.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIGS. 1A to 1C illustrate one embodiment of a container for holding electronic parts;

DETAILED DESCRIPTION OF THE PREFERRED EMBODIMENT

Figure 2:
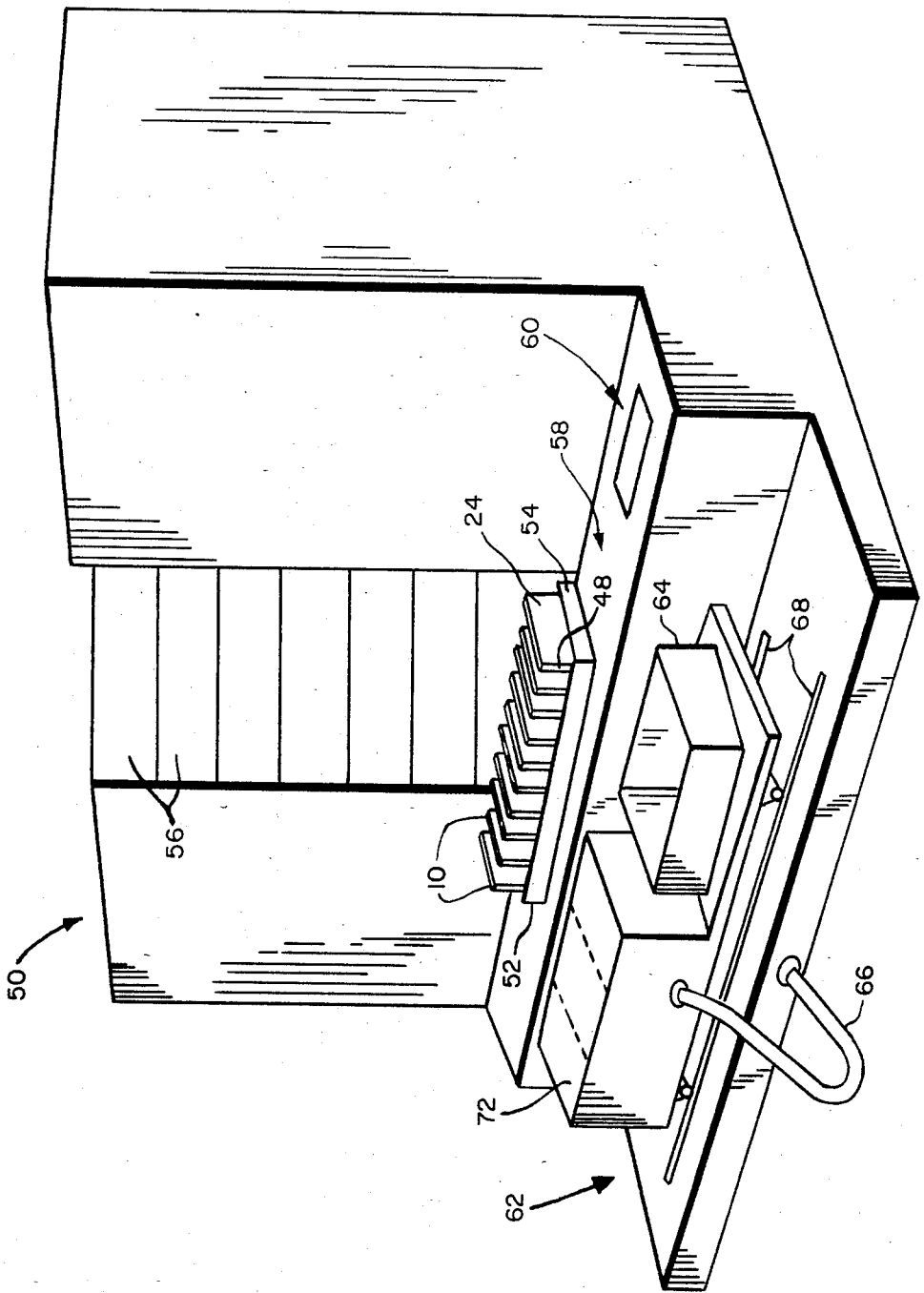
FIG. 2 illustrates the automatic storage and retrieval apparatus with a partial view of the robot means thereon.

Referring to FIGS. 1A to 1C, a container 10 is illustrated for holding electrical parts 12 such as resistors 14. Container 10 has a rectangular shaped bottom 16, a front side 18 and a back side, not shown, a left side 20, a right side 22, and a top 24.

Bottom 16 has four ridges 26 running longitudinally to bottom 16 which are shown in outline in FIG. 1C and in cross section in FIG. 1A. Along each ridge 26 are a plurality of notches 28, each notch 28 being directly opposite another notch 28 in the adjacent ridge 26 such that when resistor 14 is placed therein leads 30 and 32 rest in transverse notches 28 as shown in FIG. 1C.

As shown in FIG. 1A, sides 20 and 22 have attached along the tops grooved tracks 34 and 36 for holding lid 24 therein. Lid 24 slids with a minimum of resistance in tracks 34 and 36. Lid 24 has two depressed ridges 38 and 40 positioned closely to leads 30 and 32 such that resistors 14 will not fall from its position if container 10 is inverted unless lid 24 is removed thereover. As seen in FIG. 1A, ridge 40, for example, is positioned to hold lead 32 in notches 28 because of the overlapping of peaks 42, 44 and 46. Additionally, lid 24 has a front lip 48, FIG. 1B, that can be used for opening and closing of lid 24. Front side 18 is shaped to allow ridges 38 and 40 to pass upon opening. A back side is not shown but would be attached to bottom 16 and sides 20 and 22 for strenghtening of container 10.

Container 10 can be made of plastic or metal and can be formed by stamping or any other conventional technique. Although container 10 is one embodiment, other containers functioning in the same manner would be acceptable such as the one shown in FIGS. 5A and 5B.

Figure 5A:
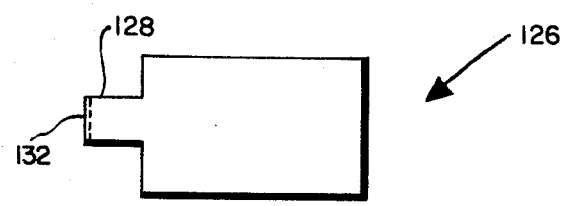
FIGS. 5A and 5B illustrate another embodiment of a container.
Figure 5B:
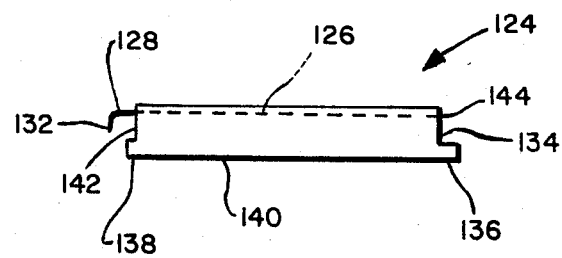

FIG. 5A illustrates a lid 126 that slids into a container housing 134 like that shown in FIG. 5B. Lid 126 has a projecting tab 128 having thereon a lip 132. As seen in FIG. 5B housing 134 has projecting tabs 136 and 138 on a bottom 140. Tabs 136 and 138 are located on a front side 142 and a back side 144 of housing 134, respectively. The interior arrangement can be the same as shown in container 10.

It should also be clear that not only resistors would be stored in container 10 but many other small electronic components. Clearly the design of the ridges therein would be altered to accommodate their particular shape. The one key element to any container such as container 10 is that when inverted and lid 24 is opened, the parts therein will fall out by gravity one at a time as lid 24 is additionally opened.

A plurality of containers 10 are placed in a tray 54 shown in FIG. 2, being only one of a number of trays 54 stored in an automatic storage and retrieval apparatus 50, such as the "Minitrieve MH" sold by Lyon Metal Products, Inc. of Aurora, Ill. Tray 54 has a rectangular shaped bottom with low sides 52 attached thereto so that containers 10 when placed therein are almost totally exposed. For example, containers 10 when placed in tray 54 would be laying on sides 22 and have all lids 24 facing the same direction. Lid lip 48, shown in FIG. 1B, would be facing away from apparatus 50.

Automatic storage and retrieval apparatus 50 has a plurality of storage locations 56 wherein trays 54 are placed. A transporting means, not shown, is able to locate the desired tray 54 in locations 56, remove the desired tray 54, and place the desired tray 54 at a transfer location 58. The above sequence is both reversable and repeatable for different trays 54. Each tray 54 placed at transfer location 58 would be placed in a similar manner. Automatic storage and retrieval apparatus is controlled by a computer means 60 which would have stored therein for each part the storage location 56 for each tray 54, the location of container 10 in tray 54, and the number of parts remaining therein. The computer means 60 would direct the transporting means to retrieve and store trays 54 in this process. Further, computer means 60 must have input a kit order to start the process. The kit order would be a listing of the parts by type and number desired.

Once a selected tray 54 is placed in transfer location 58, a robot means 62 having thereon a kit box 64 causes a selected container 10 to be removed from tray 54 and positioned in an inverted position above box 64. Robot means 62 then opens lid 24 a desired amount so that a selected number of parts fall into box 64. Lid 24 is closed and selected container 10 is replaced in tray 54.

Figure 7:
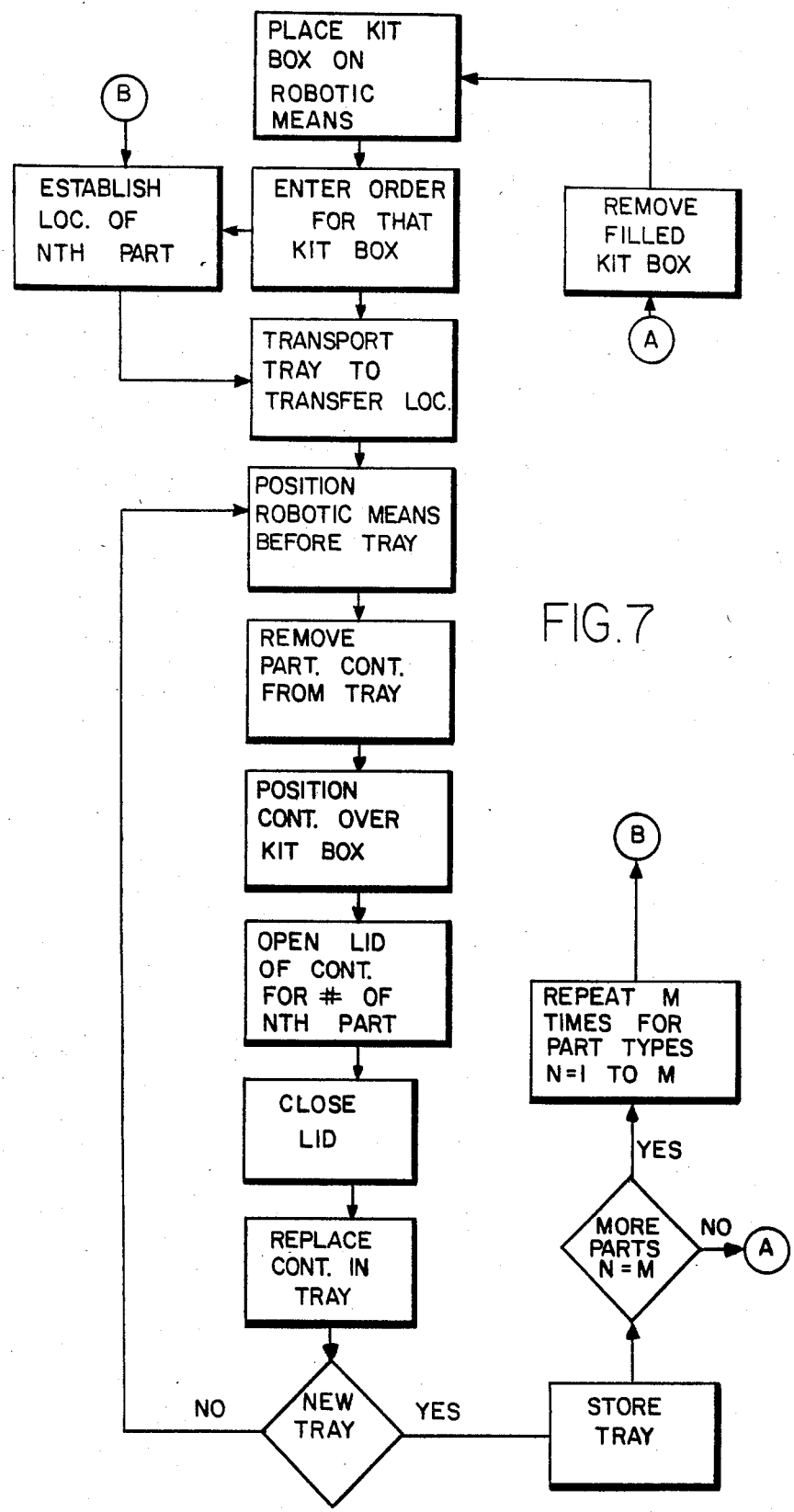
FIG. 7 is a flow diagram of the steps needed to fill the kit box.

Computer means 60 can also be used to drive robot means 62. A flow diagram is shown in FIG. 7 for filling kit box 64 with M part types of a given number for each type.

Referring to FIG. 2, robot means 62 is connected electrically to a power source, not shown, and to computer means 60 by way of a cable 66. Robot means 62 is able to translate along tracks 68 so as to position a robot arm 70, shown in FIG. 3, that is mounted on a platform 72 of robot means 62. This positioning in front of selected container 10 in tray 54 minimizes robot arm 70 movement.

Robot arm 70 operates essentially like that shown in U.S. Pat. No. 3,826,383 which is incorporated by reference.

Figure 6:
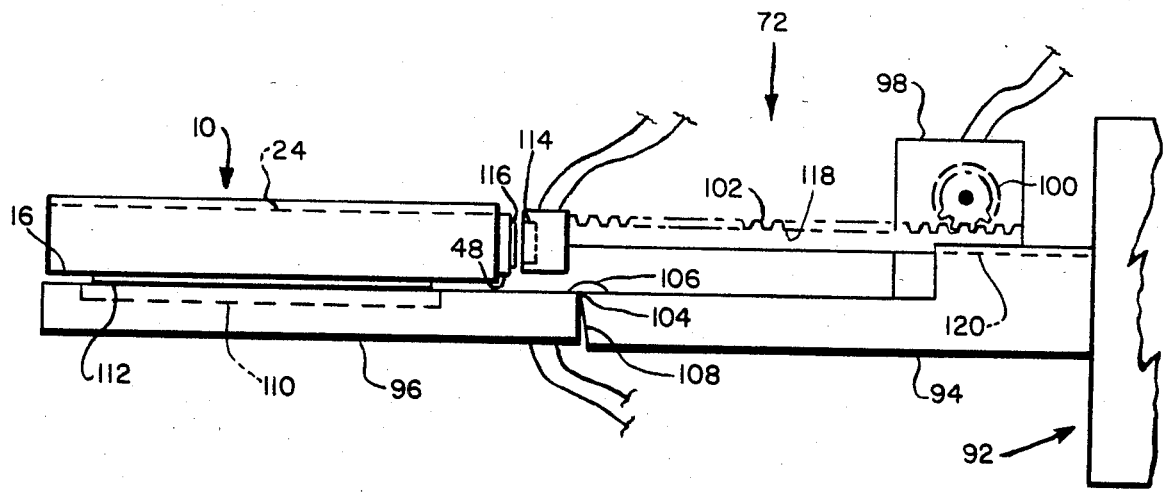
FIG. 6 illustrates another embodiment of a gripping means attached to the robot arm of FIG. 3.
Figure 4:
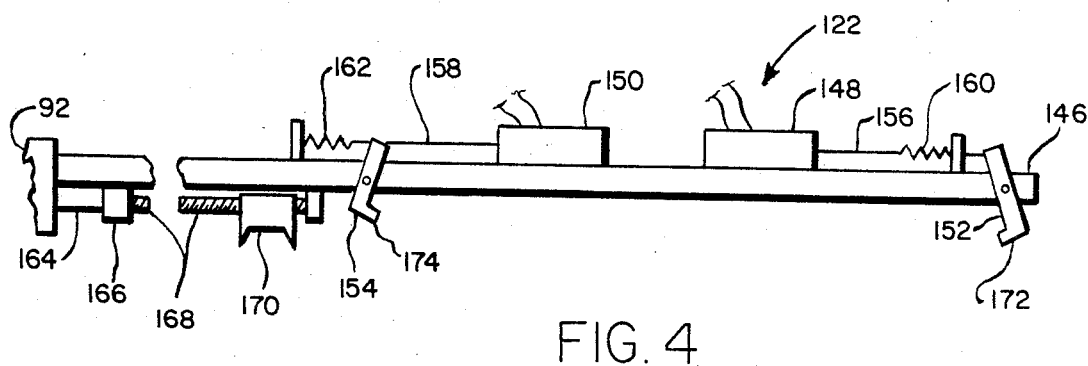
FIG. 4 illustrates one embodiment of a gripping means attached to the robot arm of FIG. 3.

Gripping means for robot arm 70 can be either a gripper 72, shown in FIG. 6, or a gripper 122, shown in FIG. 4. Gripper 122 operates on a container 124 shown in FIGS. 5A and 5B, and gripper 72 operates on container 10 shown in FIGS. 1A to 1C. The gripping means is attached mechanically and electrically to arm 74 of robot arm 70.

Figure 3:
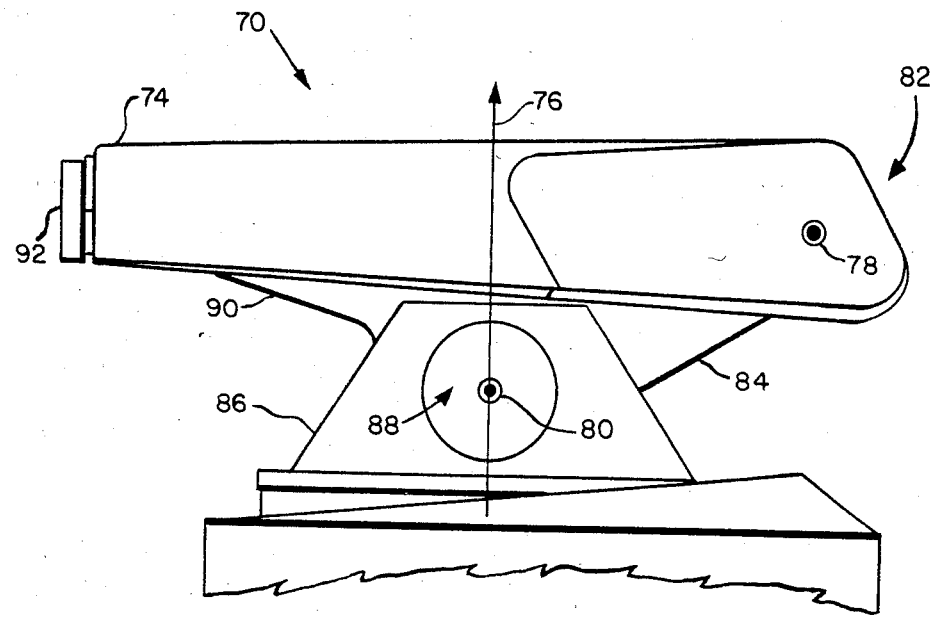
FIG. 3 illustrates a robot arm used to remove a selected container from a transfer location to a parts receiving location.

Referring to FIG. 3, robot arm 70 is attached to platform 72 and receives power from robot means 62 and control instructions from computer means 60.

Arm 74 is rotatable about a vertical axis 76 and about two horizontal axes 78 and 80. An additional degree of freedom is provided by a rotatable wrist joint 92 which is attached to arm 74. Either gripper 72 or 122 may be attached directly to rotatable wrist joint 92 as shown in FIG. 4 or FIG. 6. Computer 60 would provide necessary signals to actuate the electrical components on either gripper 72 or 122. The sequence of the signals provided would depend on the position of the gripper 72 or 122.

Driving power to gripper 72 is provided through drive shafts, bevel gears, belt pulleys, etc., not shown, by various electric motors as controlled by a program in computer means 60.

Arm 74 is connected by a first horizontal elbow joint 82 to a lower arm 84. Lower arm 84 is connected to a horizontally rotating base 86 by a second horizontal elbow joint 88. A strut 90 is connected between arm 74 and lower arm 84 at pivot joints, not shown. Drive power to arm 74 is also provided through drive shafts, bevel gears, belt pulleys etc., not shown, by various electric motors, as controlled by the program in computer means 60.

One embodiment of gripper 122 is shown in FIG. 4. This picks up, holds, and opens a container 124 as shown in FIGS. 5A to 5B.

In order to transport container 124 gripper 122 has a housing 146, with a first and second solenoid 148 and 150 attached thereon, a first and second claw 152 and 154, a first and second solenoid shaft 156 and 158, a first and second biasing spring 160 and 162 on shaft 156 and 158, respectively, an electric motor 164, reduction gears 166, a screw shaft 168 and a lid puller 170. Housing 146 is attached to wrist joint 92 which can rotate about an axis parallel to arm 74.

As shown in FIG. 4, solenoids 158 and 160 are actuated causing shafts 156 and 158 to be pulled inward and thus causing claws 152 and 154 to be in an open position for ready engagement to tabs 136 and 138 of housing 134 of container 124. When solenoids 148 and 150 are unactuated, springs 160 and 162 force claws 152 and 154 to a vertical position. At this point tabs 136 and 138 would be engaged by lips 172 and 174 of claws 152 and 154, respectively.

In order to open lid 126, lid puller 170 would be engaged on lip 132 of lid 126. Motor 164 is actuated and acts through reduction gears 166 to cause a screw shaft 168 to rotate to cause lid puller 170 to translate to the left and thus open lid 126 for container 124. The reversing of motor 164 causing lid 126 to move to the right. Gripper 122 comes into engagement with container 124 by moving directly downward as the container 124 rests in tray 54. Lip 132 is facing robot means 62 and lid 126 is facing to the right of FIG. 2 in transfer position 58.

As shown in FIG. 6, gripper 72 is also connected to arm 74 at wrist joint 92. Gripper 72 has a support 94 upon which is attached a finger member 96, a stepper motor 98 with a gear 100, and a geared finger member 102.

Finger member 96 rotates about a joint 104. A spring biasing member 106 forces finger member 96 in a counter clockwise direction until member 96 stops against a slanting wall 108. An electromagnet 110 is securely mounted in finger member 96 and when energized causes finger member 96 to rotate clockwise until electromagnet 110 comes into direct contact with a metal plate 112 attached to bottom 16 of container 10. As long as electromagnet 110 is energized container 10 can be transported out of tray 54 and will remain securely attached to finger member 96.

Geared finger member 102 also has an electromagnet 114 attached thereto and when energized electromagnet 114 will attract a metal plate 116 attached to lip 48 of lid 24 of container 10. To open lid 24 a desired amount, stepper motor 98 is energized to cause gear 100 to rotate counter clockwise on rack gear 118. This action translates geared finger member 102 rearwardly until motor 98 is de-energized. The reverse rotation of motor 98 will close lid 24. Geared finger member 102 travels in a track 120 and is retained therein during translation of lid 24.

Finger member 96 for lifting and holding container 10 is sufficiently thin to fit easily within containers 10 stored in tray 54. Containers 10 are arranged in tray 54 to minimize movement of robot means 62. Containers 10 have lids 24 facing to the right as shown in FIG. 2.

To position one of containers 10 or 124 over kit box 64, the following movements would be sufficient. Robot means 62 translates along track 68 so that robot arm 74 is directly opposite selected container 10. Selected container 10 is engaged by gripper 72, for example, and is raised such that selected container 10 is rotated 90° counter clockwise about an axis perpendicular to lid 24 to its position in tray 54. In this second position selected container 10 is then lowered to a third position directly over kit box 64 with lid 24 facing into box 64. To obtain this third position after reaching the second position, arm 74 must rotate 90° clockwise about axis 76 and then wrist joint 92 must rotate 90° counter clockwise about arm 74 then arm 74 is lowered to the third position. In the third position, lid 24 is selectively opened by geared finger member 102. A reversing of the above places selected container 10 back in tray 54.

Although the above description of the movement of robot arm 70 requires movement about three axes or more, container 10 or 126 can be moved from tray 54 to kit box 64 with rotation about only two axes as a minimum. The robot arm for such is not shown but the sequence of movement is as follows: referring to FIG. 2, the arm with a gripper thereon such as gripper 72 or 122 would attach to container 10 in tray 54; the arm would rotate counter clockwise about a first axis parallel tracks 68 to bring container 10 to a vertical position with lid 24 facing to the right; thereafter, the arm would rotate clockwise about an axis perpendicular tracks 68 to lower container 10 over kit box 64; lid 24 would then be opened by the gripper; and the reverse movement would place container 10 back into tray 54.

In operation, automatic storage and retrieval apparatus 50 after receiving the kit order through computer means 60, places tray 54 upon transfer location 58. At this point robot means 62 positions directly in front of the selected container 10 or 124 which ever is used. Robot arm 70 with either gripper 72 or 122 thereon depending on the container used moves selected container 124, for example, to a position directly over kit box 64 whereupon lid 126 is selectively opened to allow a desired number of parts therein to fall into kit box 64. Lid 126 is closed and container 124 is placed back into tray 54 by robot arm 70. This operation is repeated for each different type of part required by the kit order.

Clearly, many modifications and variations of the present invention are possible in light of the above teachings and it is therefore understood, that within the inventive scope of the inventive concept, the invention may be practiced otherwise than specifically claimed.

What is claimed is:

1. A method of packaging, storing, and retrieving a plurality of component parts of a kit to fill an order for said kit, said method comprising the steps of:
   a. placing said plurality of component parts into a plurality of identically structured, configured, and dimensioned component parts containers, each of said containers having an open top closeable with a slideably movable lid;
   b. closing the open top of each of said containers by sliding said movable lid into a closed position on said open top, thereby enclosing said component parts within said container, whereby said small component parts are thereby packaged;
   c. placing said containers being closed in a plurality of open storage trays;
   d. storing said storage trays with said container placed therein in an automatic storage and retrieval apparatus of the type which, upon command, is capable of automatically storing said storage trays in storage locations within said apparatus, and which, upon another command, is capable of automatically retrieving said storage trays from said storage locations and delivering a selected storage tray to a transfer location, whereby said small component parts are thereby stored, but retrievable;
   e. positioning an open-top kit box adjacent to said transfer location;
   f. retrieving automatically, when an order is received for said kit, said selected storage tray from said automatic storage and retrieval apparatus, whereby said selected storage tray is automatically delivered to said transfer location;
   g. removing, with a robot means, a selected container from said selected storage tray;
   h. positioning, with said robot means, said selected container in an inverted, lid-down orientation in a position over said open-top kit box;
   i. slideably retracting, with said robot means, said slideably movable lid of said selected container, whereby when said selected container is opened, a desired number of said component parts fall from said selected container and drop into said kit box;
   j. closing said selected container by moving said lid;
   k. replacing said selected container into said selected storage tray by said robot means;
   l. returning said selected tray to said storage location;
   m. repeating the necessary steps above until said order for said kit is filled; and
   n. replacing said kit box after being filled with an empty kit box.

* * * * *